Oct. 21, 1924.
W. H. SAYRE
BRAKE SHOE
Filed March 17, 1920   2 Sheets-Sheet 1
1,512,862
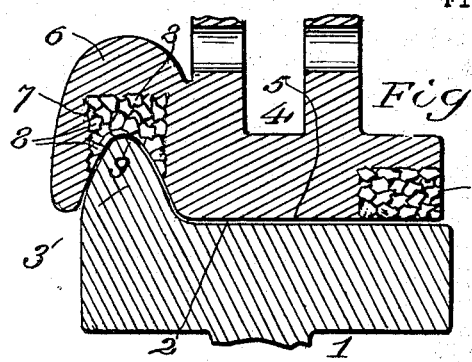
Fig. 1
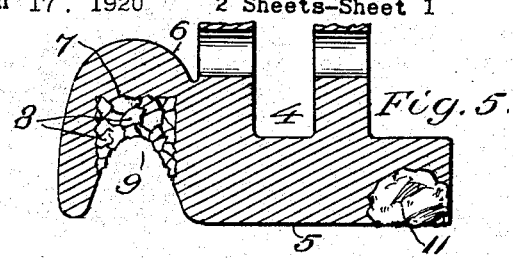
Fig. 5
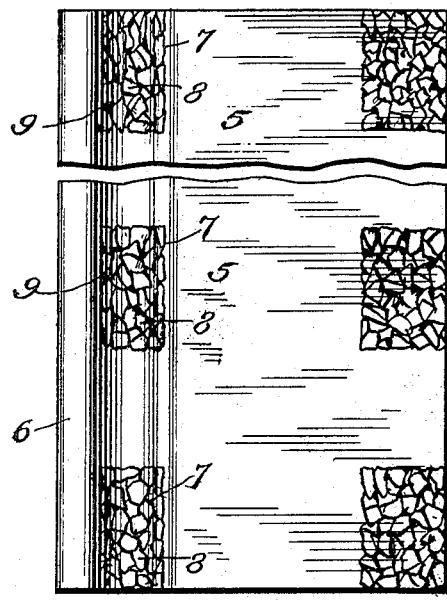
Fig. 2
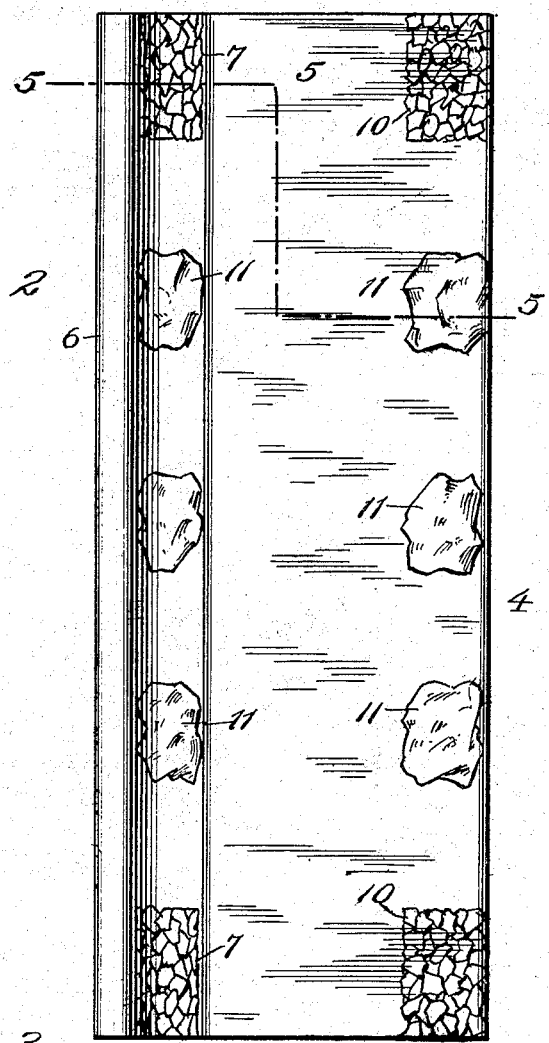
Fig. 4
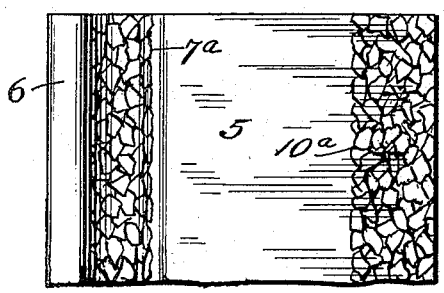
Fig. 3
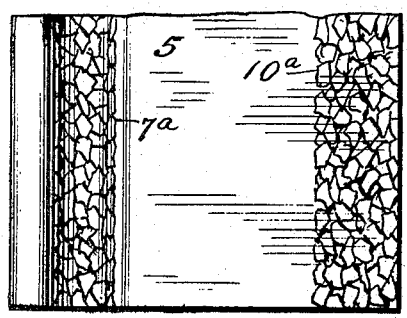
INVENTOR.
W. H. Sayre
BY
W. J. Dolan
ATTORNEY.

Oct. 21, 1924.  
W. H. SAYRE  
BRAKE SHOE  
Filed March 17, 1920  
1,512,862  
2 Sheets-Sheet 2

INVENTOR.  
W. H. Sayre  
BY  
W. J. Dolan  
ATTORNEY.

Patented Oct. 21, 1924.

1,512,862

UNITED STATES PATENT OFFICE.

WILLIAM H. SAYRE, OF GLEN RIDGE, NEW JERSEY; WILLIAM HEYSHAM SAYRE, WILLIAM M. BEARD, AND ELIZABETH BARTHOLOMEW SAYRE, EXECUTORS OF SAID WILLIAM H. SAYRE, DECEASED, ASSIGNORS TO AMERICAN ABRASIVE METALS COMPANY, A CORPORATION OF NEW YORK.

BRAKE SHOE.

Application filed March 17, 1920. Serial No. 366,546.

*To all whom it may concern:*

Be it known that I, WILLIAM H. SAYRE, a citizen of the United States, residing at Glen Ridge, in the county of Essex and State of New Jersey, have invented certain new and useful Improvements in Brake Shoes, of which the following is a specification, reference being had therein to the accompanying drawings.

This invention relates to brake shoes designed for applying braking pressure to wheels, and has reference more particularly to brake shoes used in connection with flanged wheels such as are employed on railways, the invention consisting in certain improvements in that type of brake shoes which are provided with relatively hard trimming elements designed, as an incident to the braking action of the shoe, to automatically trim or wear down the periphery of the wheel and preserve its true circular form.

On account of the wear which takes place in practice on a car wheel at different points, sometimes on the flange, sometimes at the center of the tread, and at other times at the end portion of the tread, according to the different conditions and circumstances of use, the brake shoe has been provided with trimming elements at correspondingly different points for the purpose of preserving the true circular form and contour of the wheel, to the end that the wheel will travel in the proper manner on the track and the flange will cooperate in the proper manner with the edge of the rail head, the switch rails and switch points. In this connection the preservation of the transverse contour of the flange is a very important and vital consideration, for if the flange of the wheel is changed in contour, for instance flattened in the action of the trimming element thereon, the wheel is liable to leave the track, more particularly when passing over switches, with consequent danger of wrecks and destruction of life and property.

My invention aims to avoid this liability, and the invention consists primarily in providing the brake shoe with a trimming element composed of a material which will not be impaired or dissipated by the heat of the molten metal in the casting operation of the shoe, the said element being embedded in the shoe in the casting operation in position to act on the flange of the wheel, and having its active or trimming surface conformed substantially to the transverse contour of said flange, so that in the operation of the shoe in braking the wheel, the flange of the latter will be trimmed down by the trimming element and its original and proper contour preserved.

The invention consists also in combining with a trimming element of this character, an additional trimming element or elements, either conforming to the transverse contour of the wheel flange, or in non-conforming relation thereto, and in position to act on the flange and cooperate with the first mentioned element.

The invention further consists in combining with a trimming element conformed to the transverse contour of the wheel flange, an additional trimming element or elements positioned in the brake shoe to act on the tread of the wheel.

The invention consists also in an improved method of casting to embed the trimming element in the cast product.

In the accompanying drawings:

Fig. 1 is a cross section through a brake shoe and the rim or tire of a flanged wheel, the said brake shoe having my invention embodied therein in its preferred form.

Fig. 2 is a face view of the brake shoe showing one arrangement of the trimming elements.

Fig. 3 is a similar view showing another arrangement of the trimming elements.

Fig. 4 is a similar view showing still another arrangement.

Fig. 5 is a cross section on the line 5—5 of Fig. 4.

Figure 6:
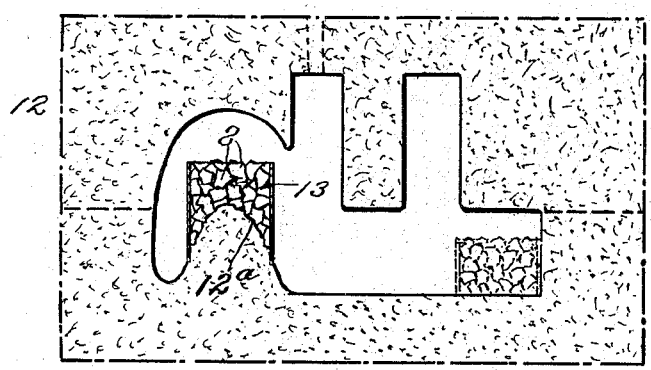
Fig. 6 is a cross section through a mold suitable for casting a brake shoe with a trimming element therein in accordance with my invention, this figure illustrating the improved method involved in the casting of the shoe.
Figure 7:
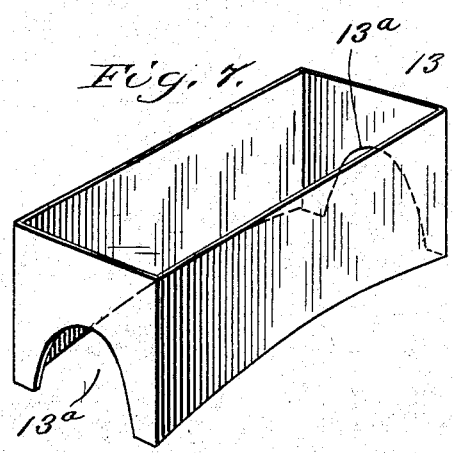
Fig. 7 is a perspective view of the container employed to confine the bodies of the trimming element in the mold in the casting operation.

Referring to Figs. 1 and 2, 1 designates a rim or tire of a wheel having the usual cylindrical tread portion 2 and the flange 3 at one edge, which flange is curved at its peripheral edge transversely or in the direction of the axis of the wheel as usual in car wheels. 4 designates a brake shoe composed of a cast metal body portion which is curved circumferentially to follow the corresponding curvature of the wheel rim and is formed with a flat portion 5 to cooperate with the tread of the wheel, and with a flanged or offset portion 6 at one edge to cooperate with the flange of the wheel. 7 designates a flange trimming element which constitutes the main feature of my invention and which is applied to the inner side of the offset portion of the brake shoe and is formed with a groove curved in the direction of the axis of the wheel so as to conform to the corresponding contour of the wheel flange, which latter is received in the groove of the trimming element when the shoe is forced against the wheel rim to apply braking pressure thereto. This trimming element may be formed of various materials which will not be destroyed or dissipated by the heat of the metal in casting the shoe, so that the element can be incorporated in the shoe in the casting operation of the latter, and will have an abrasive or trimming action on the flange of the wheel, thereby gradually trimming or wearing the same down in the braking action, such wear, due to the fact that the trimming surface conforms to the transverse contour of the wheel flange, causing the latter to wear down evenly and uniformly at all points and thereby preserving said contour. For instance, the trimming element may be composed of emery, or carborundum, or alundum, or any other suitable or appropriate abrasive or vitrified material or composition suitably disposed and arranged so that it will be held firmly and fixedly in the body of the shoe and will present a groove or depression which will receive the flange of the wheel. I prefer however to construct the trimming element in the form of a local collection or aggregation of hard mineral bodies 8 of lump form of substantial size, and of a material, such as alundum, corundum, carborundum and the like, which will not be impaired or destroyed by the heat of the body metal in the casting operation. As shown in Fig. 1 these bodies are embedded in aggregate or massed form in the offset portion of the shoe, and are firmly held therein by the metal of the shoe surrounding the mass as a whole and by the solidified metal distributed between the individual bodies. The exposed active trimming surface 9 of the element is curved inwardly so as to substantially conform to the transverse contour of the wheel flange 3, whereby as the trimming operation progresses when the brake shoe is forced against the wheel to brake the same, the flange will be trimmed down and its circumferential and transverse contour will be preserved.

A number of such trimming elements may be applied to the shoe and spaced apart in a circumferential direction as shown in Fig. 2; or the trimming element may be formed as a continuous structure 7$^a$ as shown in Fig. 3, and trimming elements 10 is similar in construction to the elements 7 may be applied to the flat portion 5 of the brake shoe to act on the end portion of the tread of the wheel to prevent the growth or formation of a shoulder or projecting portion at this point, when the wear on the wheel in practice takes place at the central portion of the tread; and these elements 10 may be either spaced apart circumferentially of the wheel as shown in Fig. 2 or they may be formed as a continuous structure 10$^a$ as shown in Fig. 3. As illustrated in Fig. 4 there may be combined with either the elements 7 or 10 or both, a number of trimming elements 11 in the form each of a comparatively large lump of hard material such as carborundum, corundum, alundum and the like, embedded in the shoe in line with the other elements to aid in the trimming action at corresponding points on the wheel.

The incorporation or embedding of the trimming elements of the form designated by the numerals 7, 10 and 10$^a$ may be conveniently effected in a sand mold 12 as shown in Fig. 6, the procedure carried out in this mold constituting the improved method forming one part of my invention. In preparing the mold for the cast, I provide a container 13 for holding and confining the hard mineral bodies 8 of the trimming element during the casting operation, which container in the present instance is in the form of a rectangular open ended casing which is applied to that part of the mold surface which is to shape the trimming surface of the trimming element. This container is composed of a material which will become dissipated by the heat of the molten metal of the casting, and will lose its identity in the metal. Preferably the container is made of thin metal.

In the example shown, the surface of the mold to which the container is applied is a curved surface 12$^a$ which is to shape that portion of the brake shoe which acts on the flange of the wheel, and the container to adapt it to this surface, has its end walls provided with curved recesses 13$^a$ to conform to the curvature of the mold surface. The container is set in place on this surface of the mold and is pushed down lightly into the sand so that its lower edges will become slightly embedded and will thus hold the container against displacement when the molten metal is poured into the mold. I next assemble in the container, an aggregation of the hard mineral bodies 8 which will become distributed over the curved mold surface as shown in Fig. 6. The mold is now ready to receive the molten metal, which being poured in the mold, will fill the same, fuse and dissipate the container 13 and will surround and flow in between the bodies 8 which latter will be bound together and embedded in the cast as a local trimming element, whose exposed trimming surface will conform to that surface of the mold against which the bodies were assembled in the container. If the trimming element is to be applied to the flat portion 5 of the shoe, the procedure above described would be the same, except that the curved recesses in the ends of the container would be omitted and the container would be applied to the mold in the position shown in dotted lines in Fig. 6.

By the construction and formation of the trimming elements as above described, it may be applied to the shoe at comparatively small expense, will be durable in form, and will operate with uniformity and effectiveness in trimming the wheel and in preserving its true circular form and transverse contour.

In the foregoing description and accompanying drawings I have set forth my invention in the particular detailed form which I prefer to adopt. It will be manifest however that these details may be variously changed, both as to their construction, and the method of procedure without departing from the limits of my invention; and further it will be understood that the invention is not limited to any particular form or construction of the parts except in so far as such limitations are specified in the claims.

What is claimed is:

1. In combination with a brake shoe composed of a metal body adapted for applying braking pressure to a flanged wheel, a relatively harder local flange-trimming element in said body having a trimming surface conformed to the transverse contour of the flange to preserve said contour as the trimming operation progresses, and an additional local trimming element in said body of non-conforming relation to the contour of the flange and in position to act on the flange in cooperation with the trimming action of the first mentioned element.

2. In combination with a brake shoe composed of a metal body adapted for applying braking pressure to a flanged wheel, a relatively harder local flange-trimming element in said body having its trimming surface conformed to the transverse contour of the flange to preserve said contour as the trimming operation progresses, and an additional local trimming element in the form of a lump of material harder than the body and embedded therein in position to act on the flange in cooperation with the action of the first mentioned element.

3. In combination with a brake shoe composed of a metal body adapted for applying braking pressure to the flange and tread of a wheel, a relatively hard local trimming element in said body having its trimming surface conformed to the transverse contour of the wheel flange to embrace the sides of the same, and an additional local trimming element in the form of a lump of relatively hard material embedded in the body in position to act on the tread of the wheel, the braking surface of the shoe being composed mainly of the metal of the shoe and in less degree of said trimming elements.

In testimony whereof, I have affixed my signature hereto.

WILLIAM H. SAYRE.